United States Patent [19]

Ruin

[11] Patent Number: 4,651,945
[45] Date of Patent: Mar. 24, 1987

[54] REMOVABLE SPOOL FOR A FISHING ROD REEL

[75] Inventor: Jean Ruin, Cluses, France

[73] Assignee: Mitchell Sports, France

[21] Appl. No.: 790,327

[22] Filed: Oct. 23, 1985

[30] Foreign Application Priority Data

Oct. 24, 1984 [FR] France ................................ 84 16615

[51] Int. Cl.⁴ .............................................. A01K 89/02
[52] U.S. Cl. ............................... 242/84.2 R; 403/233; 403/291
[58] Field of Search .................... 242/84.2 R, 84.21 R, 242/84.1 K; 403/233, 291

[56] References Cited

U.S. PATENT DOCUMENTS 4,061,288 12/1977 Karlsson et al. .............. 242/84.1 K
4,327,880 5/1982 Döbandt ........................ 242/84.2 R
4,535,953 8/1985 Omori .......................... 242/84.21 R

FOREIGN PATENT DOCUMENTS 1239872 7/1960 France ........................... 242/84.2 R Primary Examiner—Billy S. Taylor
Attorney, Agent, or Firm—Ratner & Prestia

[57] ABSTRACT

A removable spool for a fishing rod reel is provided comprising a front face having a slightly proeminent and smoothly rounded convex shape forming a smooth surface free of roughnesses on which the line cannot catch. This front face is formed by a resilient membrane integral with a push button for disengaging the spool from its support shaft.

6 Claims, 4 Drawing Figures

REMOVABLE SPOOL FOR A FISHING ROD REEL

BACKGROUND OF THE INVENTION

1. Field of the Invention

The present invention relates to reels for fishing rods, whose line reserve, called "spool" or "drum", is a part substantially of revolution formed from two radially extending flanges joined together by a cylindrical hub extending axially from one flange to the other.

2. Description of the Prior Art

The same reel may accept successively several spools, each spool carrying for example a line of different diameter. For that, modern spools are made removable and interchangeable by means of a quick removal device generally comprising a structure such as a bore intended to be engaged on a support shaft fixed to the reel; locking means allow the spool to be secured on the shaft against translational and rotational movements; inner release means allow the spool to be released from the shaft; the most recent release means are actuated preferably by pressing a pusher accessible on the front face of the spool, i.e. on the front face of the flange situated opposite the shaft supporting the reel.

In a known mechanism, described in patent U.S. Pat. No. 2,865,662, the end of the support shaft comprises a peripheral groove in which is engaged a resilient pin integral with the spool. The axial pusher comprises a conical end which, when pushed in, is engaged between the legs of the pin and causes it to spread out.

In normal use, the fishing rod is held by the user in a position in which the front face of the spool is directed upwardly; rainwater then tends to penetrate into the bore of the spool around the pusher and into the internal mechanism of the reel. That requires constructing the internal mechanism from elements particularly insensitive to corrosion and the humidity in any case produces a substantial lowering of the efficiency of the mechanism.

Moreover, the inner release means must be readily operable by the user; for that, the pusher must be easily reached by a finger of the user, for example by making it proeminent on the front face of the spool.

However, it is apparent that this requirement of ergonomic nature is incompatible with the reliability of the device in use; in fact, the applicants have discovered that, particularly for reels of the fixed spool type, winding up of the line tends to present discontinuities, particularly because the line tends to wind about the pusher or to adhere momentarily to one of the parts of the front face of the spool.

SUMMARY OF THE INVENTION

The purpose of the present invention is to avoid the drawbacks of known reels by proposing a new spool structure with quick removal device actuated by the front face of the spool, in which structure the front face is smooth and comprises no roughness likely to catch onto the line, while still being readily accessible for operating the release device, this front face of the spool being made totally tight and the spool then forming an efficient protective element preventing water from streaming along the support shaft of the reel.

According to another object of the present invention, the new spool structure is obtained by a particularly simple modification of a known spool structure, the modification consisting in adapting a single additional part, a flexible membrane, to the known structure. The known structure is formed by molding a plastic material. In accordance with the invention, it is thus possible to use the new structure without substantial modification of the molds and to use the same molds for producing spools of the known structure and spools of the new structure.

In particular, the invention applies for constructing or modifying spools comprising a proeminent pusher, by making the front spool face both tight and free of roughnesses.

According to another object of the invention, the front face of the spool has a certain elasticity allowing the internal release mechanism to be simplified.

According to another object of the invention, the front flange of the spool comprises an annular peripheral surface having a particularly low friction coefficient providing good sliding of the line, this surface being further sufficiently hard to prevent deterioration thereof during use, deterioration of the surface condition risking causing breaking of the line.

To attain these objects as well as others, the front face of the spool comprises a flexible impermeable membrane whose edge is sealingly secured to the rigid annular periphery of the front flange of the spool and whose inner face bears against a pusher which actuates the inner release means.

According to another characteristic of the invention, the membrane is made from an elastic material and its front face has a slightly proeminent and smoothly rounded convex shape which forms a smooth surface free of roughnesses on which the line cannot catch and which is readily accessible by the user for removal.

According to another characteristic of the invention, the elastic membrane is shaped so that its elasticity contributes to returning the pusher to a rest position in which it is spaced apart from the inner release means.

According to another characteristic of the invention, the membrane is crimped at its periphery by a ring secured to the spool body and forming the annular periphery of the front face of the spool, the ring forming simultaneously an antifriction surface for the line, this surface being particularly resistant to wear.

BRIEF DESCRIPTION OF THE DRAWINGS

Other objects, features and advantages of the present invention will be clear from the following description of particular embodiments, made with reference to the accompanying Figures in which.

DESCRIPTION OF THE PREFERRED EMBODIMENTS

Figure 1:
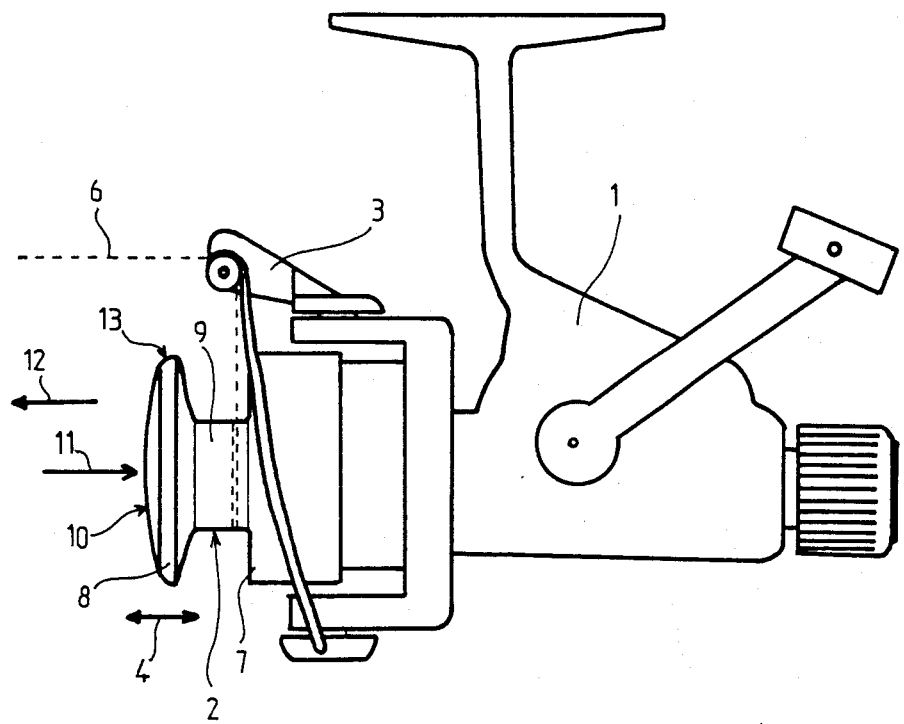
FIG. 1 shows a general view of a reel according to the present invention.

The present invention applies particularly to fishing reels of the fixed spool type. Such a reel is shown in FIG. 1. It generally comprises a body 1 containing an internal mechanism for driving and controlling a spool 2 and a line winder 3.

In fixed spool reels, spool 2 is mounted on a support shaft fixed to the reel. The support shaft is actuated by the internal mechanism of body 1 with a longitudinal reciprocal translational movement shown by the double arrows 4 for distributing line 6 during winding up thereof by winder 3.

Spool 2 comprises two radially extending flanges 7 and 8 joined together by a cylindrical hub 9 extending axially from one flange to the other. The shaft of the spool is approximately parallel to the unwinding direction of line 6. In the embodiment shown, the front flange 8, of flange disposed opposite reel body 1, comprises a front face 10 of convex shape, slightly proeminent and smoothly rounded as shown in FIG. 1. For example, the front face 10 comprises a central bar in the form of a spherical skull cap connected tangentially to a toric surface forming the peripheral surface 13 of the front flange. The front face 10 forms a smooth surface free of roughnesses on which line 6 cannot catch. Thus, at the beginning of winding up of line 6, the line is forced to wind up on the hub 9 of spool 2 without any possibility of catching onto the front face 10.

Simultaneously, this proeminent front face 10 is readily accessible by the user who, by pressing in the direction shown by arrow 11, disengages a spool 2; after disengagement, the spool is released from its support shaft and may be removed from the reel by pulling in the direction of arrow 12.

When casting, the line winder 3 is retracted and the line 6 unwinds directly from hub 9 while rubbing against the outer peripheral surface 13 of the front flange 8. In one embodiment of the invention, this outer surface 13 is formed from an inserted ring, made for example from metal or another material, whose outer surface is hard and smooth. Line 6 may slide practically without friction over this outer surface 13 which, because of the hardness of the material, is resistant to wear and to possible damage under the effect of shocks during use.

Figure 2:
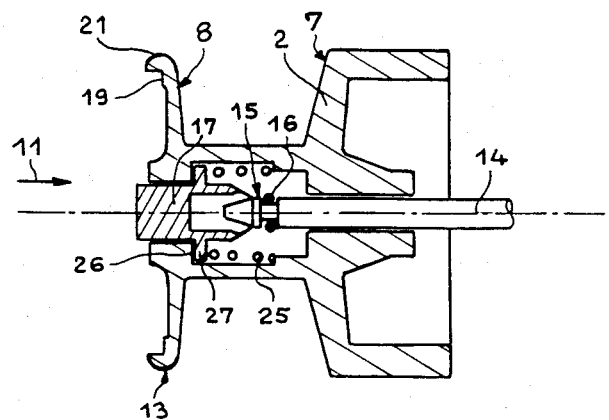
FIG. 2 shows a longitudinal sectional view of a known reel spool.

FIG. 2 shows a known embodiment of the internal structure of the spool. The removable spool 2 is fixed to the support shaft 14. As in the device known from patent U.S. Pat. No. 2,865,662, the end of shaft 14 comprises a peripheral groove 15 in which is engaged a resilient key 16 integral with spool 2. Inner release means cause key 16 to spread apart, causing disengagement thereof from groove 15 and unlocking of spool 2. The unlocking is provided by means of a proeminent axially movable push button 17 which, when pressed in the direction of arrow 11, comprises a conical end which engages between the legs of key 16 and causes it to spread out.

Figure 3:
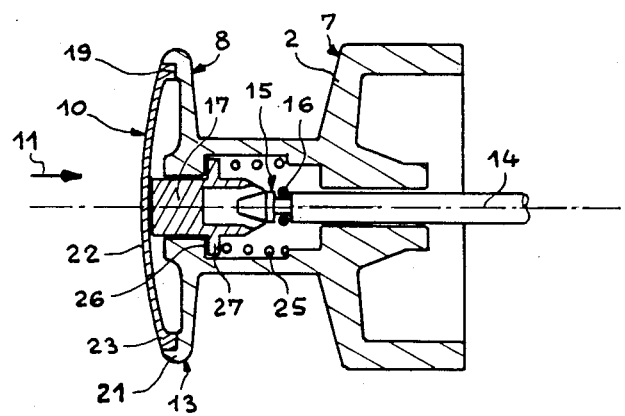
FIG. 3 shows a longitudinal sectional view of a spool according to the present invention in a first embodiment.
Figure 4:
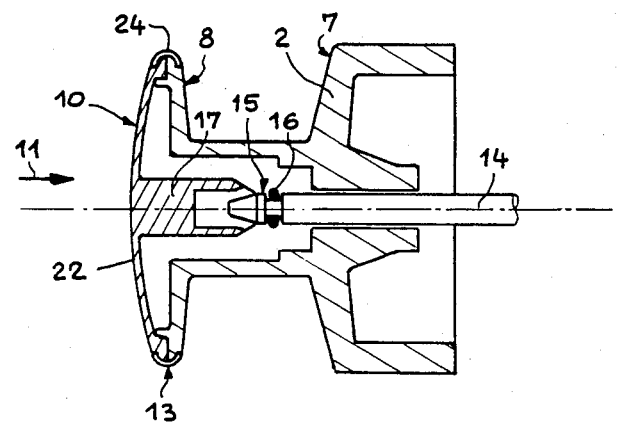
FIG. 4 shows a second embodiment of the spool.

According to the invention, and as shown in FIGS. 3 and 4, the push button 17 is covered with a front flexible and impermeable membrane 22 whose edge 23 is sealingly fixed to the rigid annular periphery 21 of the front spool flange 8, the membrane 22 and the annular periphery 21 forming the front spool surface 10. The inner face of membrane 22 is applied against push button 17. The membrane is preferably formed from a resilient material such as an elastomer. The edge 23 of membrane 22 may for example be bonded to a flat 19 of the flange, as shown in FIG. 3.

Another possibility consists in crimping the edge 23 of membrane 22 to the edge of the front flange 8; FIG. 4 shows such a method of assembly in which a metal ring 24 is fixed to the peripheral edge of the front flange 8 and simultaneously provides crimping of membrane 22 and forms the antifriction and antiwear surface 13 for line 6.

The embodiment of FIG. 3 forms a simple and inexpensive modification of the known spool of FIG. 2. Push button 17 is urged forwards by a spring 25 causing the push button 17 to move away from key 16. Stops 26 and 27 limit the travel of push button 17 and prevent ejection thereof under the action of spring 25. For locking, the user must move push button 17 against spring 25 which then brings it into the rest position shown in the Figures. The modification of the invention consists in covering the central part of the front spool face by means of membrane 22, which allows push button 17 to be actuated while providing sealing of the front face and defining an even and smooth outer surface on which the fishing line cannot catch. A resilient membrane 22 has been chosen sufficiently stiff so that the fishing line does not risk deforming it and winding about push button 17 despite its presence. The choice of materials and dimensions for forming such a membrane is within the scope of a man skilled in the art.

In the embodiment shown in FIG. 4, push button 17 is secured to membrane 22. Membrane 22 is made from a resilient material shaped so as to participate itself in returning push button 17 to the rest position shown in the Figures. By choosing a membrane of sufficient stiffness spring 25 may be omitted as well as stops 26 and 27 of the preceding embodiments.

The invention also applies to the construction of spools whose front surface is flat or concave as well as to modifications of known spools whose front face has a shape different from that shown in FIG. 2.

The present invention is not limited to the embodiments which have been explicitly described but includes the different variants and generalizations thereof contained within the scope of the following claims.

What is claimed is:

1. A removable spool for a fishing rod reel having a spool-support shaft, said spool having a radial front flange, a radial rear flange, and a generally cylindrical hollow hub interconnecting said flanges, said front flange having an axial opening there through, a push button in said axial opening and having a biased rest position in which said push button projects from said opening in both axial directions, said rear flange having an axial opening through which said support shaft extends into the hollow of said hub, inner locking means for connecting said spool to a forward end portion of said shaft for locking said spool on said shaft, said push button including means for releasing said locking means in response to rearward axial movement of said push button, said spool characterized by a continuous resilient water-impermeable membrane of generally convex configuration covering the front face of said front flange and affixed thereto at the outer periphery thereof, whereby water is prevented from reaching the inner locking means and whereby in response to axial force applied in the rearward direction to said membrane, said push button is moved from its rest position rearwardly to release said spool from said shaft.

2. The spool as claimed in claim 1, wherein said membrane having an inner face secured to the push button.

3. The spool as claimed in claim 2, wherein said resilient membrane is shaped so that its elasticity contributes to returning the push button into said rest position in which it is spaced apart from the inner locking means.

4. The spool as claimed in claim 1, wherein said membrane includes means for sealingly securing the outer periphery of the membrane to the front spool flange.

5. The spool as claimed in claim 1, wherein said front flange has an outer peripheral surface formed by a ring whose outer surface is wear resistant and smooth.

6. The spool as claimed in claim 5, wherein said membrane is crimped about its periphery by said ring, said ring forming simultaneously an antifriction surface for the line and an antiwear surface for the flange.

* * * * *